United States Patent [19]
Nakamura

[11] Patent Number: 5,758,306
[45] Date of Patent: May 26, 1998

[54] VEHICLE CRUISE CONTROL SYSTEM

[75] Inventor: Hideo Nakamura, Tokyo, Japan

[73] Assignee: Nissan Motor Co., Ltd., Kanagawa, Japan

[21] Appl. No.: 636,442

[22] Filed: Apr. 23, 1996

[30] Foreign Application Priority Data

Apr. 27, 1995 [JP] Japan .................................. 7-103859
Nov. 28, 1995 [JP] Japan .................................. 7-309293

[51] Int. Cl.$^6$ .................................................. B60K 31/04
[52] U.S. Cl. .................................. 701/93; 701/54; 701/94; 701/95; 477/107; 180/170
[58] Field of Search ...................... 364/426.041, 426.042, 364/426.043, 424.082, 424.083, 424.084, 424.085, 424.094; 477/120, 107, 108, 135; 180/170, 179

[56] References Cited

U.S. PATENT DOCUMENTS 5,012,419  4/1991  Yamamoto ........................ 364/426.043
5,038,880  8/1991  Matsuoka et al. ................... 180/179

FOREIGN PATENT DOCUMENTS 2-3539    1/1990  Japan .
4-39128   2/1992  Japan .
4-208646  7/1992  Japan .

Primary Examiner—Tan Q. Nguyen
Attorney, Agent, or Firm—Lowe, Price, LeBlanc & Becker

[57] ABSTRACT

This invention relates to a vehicle cruise controller which controls engine output and gear shift position such that a detected vehicle speed is identical to a target vehicle speed. A shift to lower gear is performed when a difference between the target vehicle speed and detected vehicle speed reaches a first predetermined value $\alpha_1$. A mechanism is provided for estimating a travel resistance of the vehicle, the travel resistance when this difference has reached a second predetermined value $\alpha_2$ which is less than the first predetermined value $\alpha_1$, being learnt as a maximum drive torque FB of the engine. A shift to higher gear is made when the estimated travel resistance has become less than this learnt maximum drive torque FB after the shift to lower gear. In this way, gear shift hunting during cruise control when the vehicle is climbing or descending slopes, is suppressed.

7 Claims, 17 Drawing Sheets

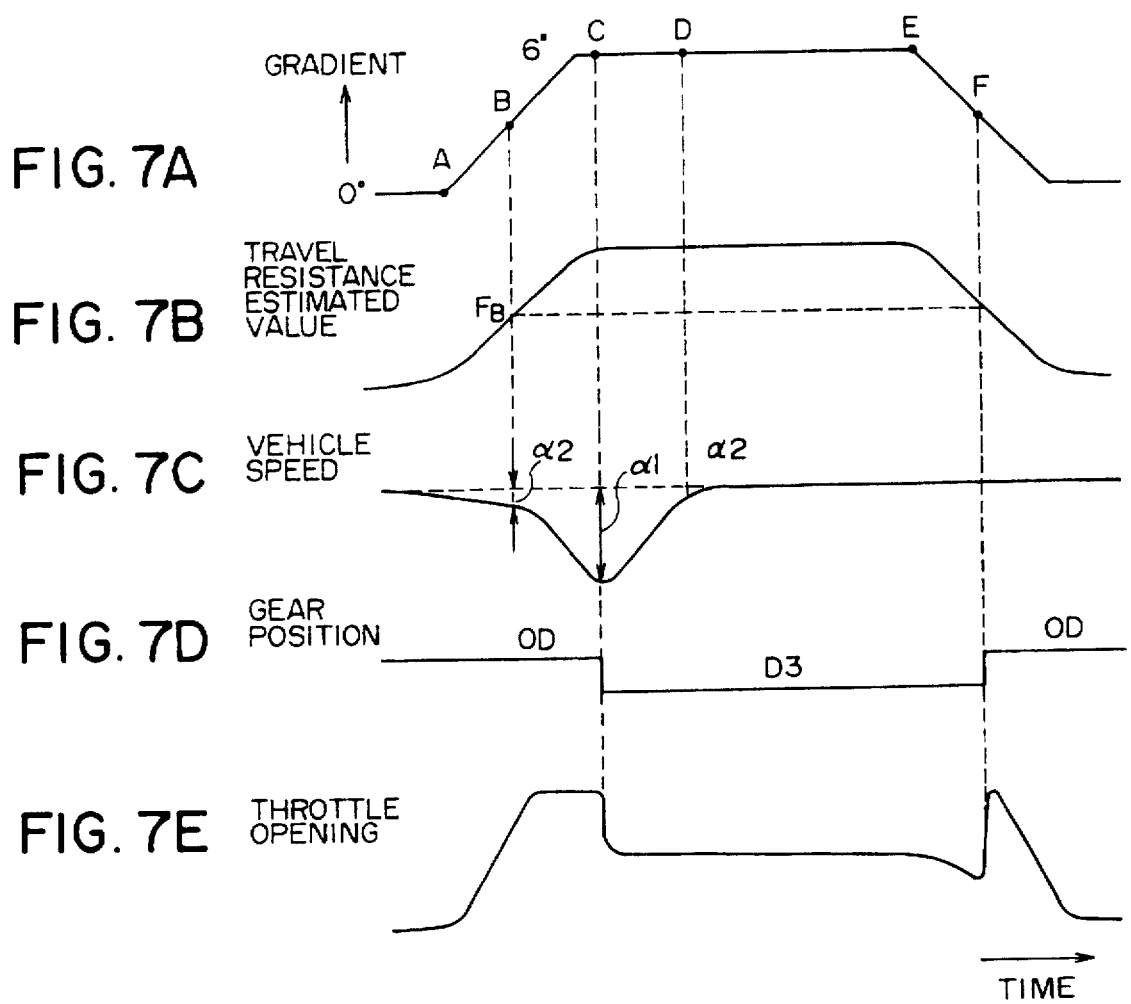

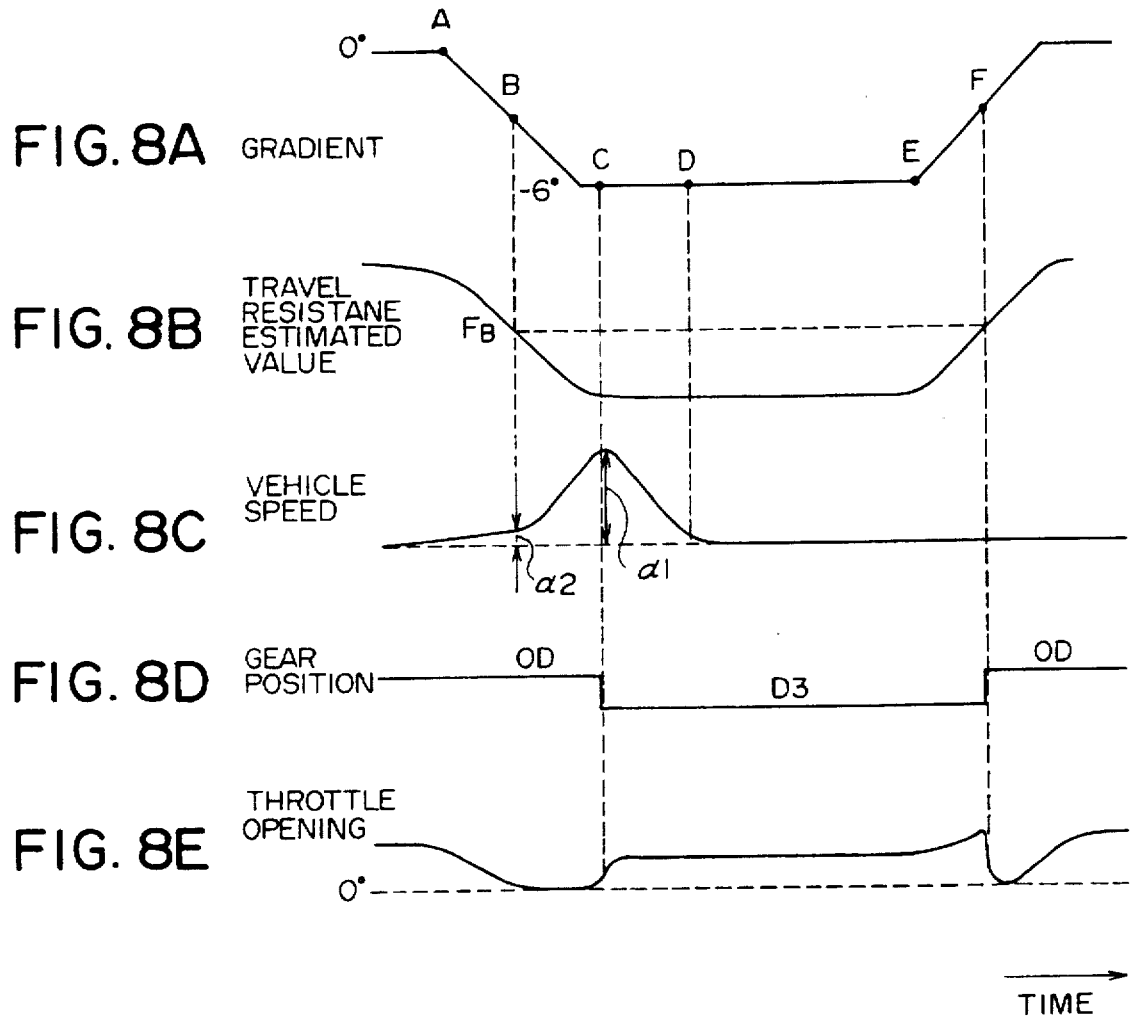

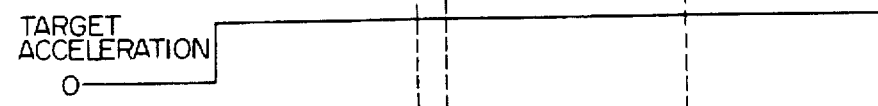
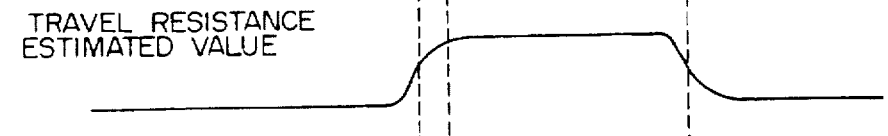
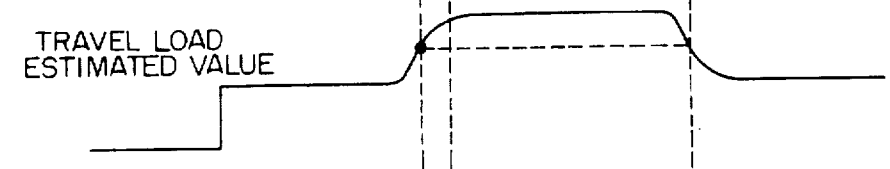
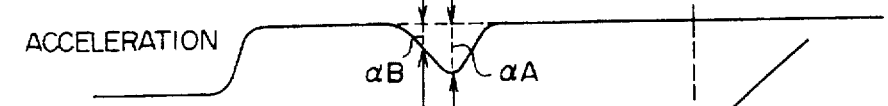
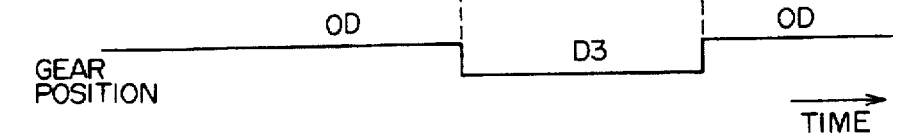

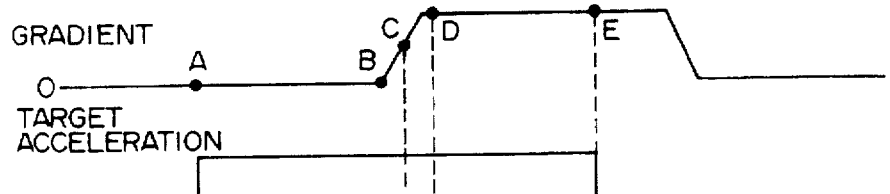
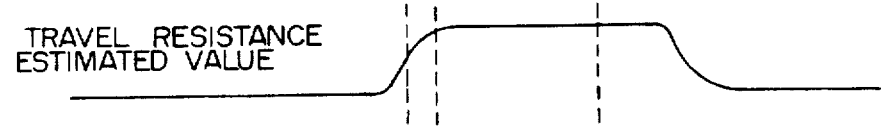
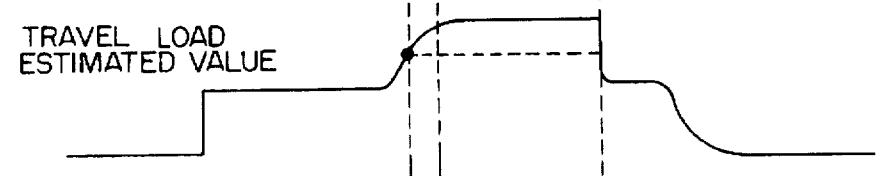
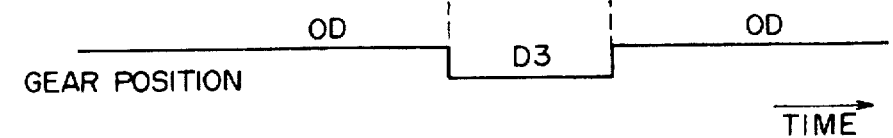

VEHICLE CRUISE CONTROL SYSTEM

FIELD OF THE INVENTION

This invention relates to the improvement of a vehicle cruise control system for allowing a vehicle to cruise at a predetermined speed.

BACKGROUND OF THE INVENTION

In a vehicle control system for controlling engine power and automatic transmission so that the vehicle travels at a specified constant speed, "hunting", a situation wherein there are frequent and repeated upward and downward shifts of gear, may occur when the vehicle is climbing a slope.

Tokkai Hei 2-3539 published by the Japanese Patent Office in 1990 discloses a system wherein the automatic transmission is shifted to lower gear when the vehicle speed falls from a target speed outside a predetermined range, and is shifted to higher gear when it is determined that the vehicle is not climbing a slope. This determination is made by comparing values of the road gradient estimated from the engine load and vehicle speed before and after a shift to lower gear.

Tokkai Hei 4-208646 published by the Japanese Patent Office in 1992 discloses a system wherein, when the throttle opening has decreased from its maximum value by a predetermined amount after a shift to lower gear, there is a shift to higher gear.

Tokkai Hei 4-39128 published by the Japanese Patent Office in 1992 applies fuzzy theory to determine whether or not the engine has reached steady state running conditions based on the engine throttle opening after there has been a shift to lower gear. There is then a shift to higher gear when the amount whereby the throttle opening has decreased after the vehicle has reached steady state running conditions, is equal to or greater than a predetermined value.

However according to Tokkai Hei 2-3539, there is a shift to higher gear after it is has been determined that the vehicle is not climbing a slope, so the vehicle tends to run at a lower gear than necessary. Further the throttle opening prior to a shift to lower gear includes an opening corresponding to the acceleration required to cancel a difference between the target speed and actual speed in order to maintain the actual speed. Still further, the road gradient may increase even more while the real vehicle speed is falling out of the predetermined range. There may therefore be a considerable error in the estimated value of the road gradient prior to the shift to lower gear. As a result, when it has been decided to shift to higher gear by comparing with this estimated value of road gradient, the target vehicle speed may not be maintained after the shift, then there is another shift to lower gear, and hunting occurs.

In the case of Tokkai Hei 4-208646, it is decided to shift to higher gear based on the amount by which the throttle has decreased after a shift to lower gear, however the variation of throttle opening and variation of drive torque are not in linear proportion to one another. Consequently when it is decided to shift to higher gear according to the decrease of throttle opening it may occur, depending on engine running characteristics and running conditions, that the target vehicle speed cannot be maintained after the shift to higher gear, so there is again a shift to lower gear and hunting occurs. Further, when for example the road gradient increases while the vehicle is accelerating due to increase of indicated speed so that it becomes difficult to reach the target speed, it may occur that a smooth shift to lower gear cannot be made.

According to Tokkai Hei 4-39128, after a shift to lower gear, a shift to higher gear is made when the engine running conditions have reached a steady state and the throttle opening has decreased by a predetermined amount, however, it is not determined whether or not the road gradient at this time can maintain the target vehicle speed after the shift to higher gear. Further, the variation of throttle opening and variation of drive torque are not proportional as stated hereintofore. There is therefore a possibility that hunting may occur.

SUMMARY OF THE INVENTION

It is therefore an object of this invention to suppress hunting of gear shifts while a vehicle is under cruise control.

It is a further object of this invention to make suitable gear shifts and smoothly accelerate or decelerate a vehicle even when a road gradient varies during acceleration or deceleration control due to increase or decrease of target speed.

In order to achieve the above objects, this invention provides a vehicle cruise control system comprising a mechanism for setting a target vehicle speed, a mechanism for detecting a vehicle speed, a mechanism for adjusting an output of an engine, a mechanism for changing-over a gear shift position, a mechanism for controlling the adjusting mechanism and changing-over mechanism such that a detected vehicle speed is identical to the target vehicle speed, a mechanism for computing a difference between the target vehicle speed and detected vehicle speed, a mechanism for commanding the changing-over mechanism to shift to lower gear position when an absolute value of the difference has reached a first predetermined value $\alpha_1$, a mechanism for estimating a travel resistance Fr of the vehicle, a mechanism for learning the estimated travel resistance Fr as a maximum drive torque FB of the engine when the difference has reached a second predetermined value $\alpha_2$ which is less than the first predetermined value $\alpha_1$, and a mechanism for commanding the changing-over mechanism to shift to higher gear position when an absolute value of the estimated travel resistance Fr has become less than an absolute value of the learned maximum drive torque FB after the shift to lower gear position.

It is preferable that the system further comprises a mechanism for determining whether or not the learning mechanism has completed learning the maximum drive torque FB, and a mechanism for commanding the changing-over mechanism to shift to higher gear position when an absolute value of the travel resistance Fr has become less than a predetermined value Fk in case the learning is not complete.

It is also preferable that the system further comprises a mechanism for detecting an output of the engine, and that the estimating mechanism is provided with a vehicle model specifying a relation between the vehicle speed and engine output when the vehicle is traveling on a flat track, a mechanism for computing, from the vehicle model, an engine output required to generate the detected vehicle speed, and a mechanism for deriving the travel resistance Fr from a difference between the computed engine output and detected engine output.

This invention also provides a vehicle cruise control system comprising a mechanism for setting a target vehicle speed, a mechanism for detecting a vehicle speed, a mechanism for adjusting an output of an engine, a mechanism for changing-over a gear shift position, a mechanism for controlling the adjusting mechanism and changing-over mechanism such that a detected vehicle speed is identical to the target vehicle speed, a mechanism for detecting a vehicle acceleration, a mechanism for modifying the target vehicle speed according to a predetermined target acceleration, a mechanism for estimating a travel resistance Fr of the vehicle, a mechanism for computing a travel load FR based on the vehicle acceleration and travel resistance Fr, a mechanism for computing a difference between the target acceleration and the detected acceleration, a first commanding mechanism for commanding the changing-over mechanism to shift to lower gear position when the absolute value of the difference has reached a first predetermined value $\alpha_A$, a mechanism for learning the travel load FR as a maximum drive torque FB of the engine when the absolute value of the difference has reached a second predetermined value $\alpha_B$ which is less than the first predetermined value $\alpha_A$, and a second commanding mechanism for commanding the changing-over mechanism to shift to higher gear position when an absolute value of the estimated travel resistance Fr has become less than an absolute value of the learned maximum drive torque FB after the shift to lower gear position.

It is preferable that the system further comprises a mechanism for detecting an output of the engine, and that the estimating mechanism is provided with a vehicle model specifying a relation between the vehicle speed and engine output when the vehicle is traveling on a flat track, a mechanism for computing, from the vehicle model, an engine output required to generate the detected vehicle speed, and a mechanism for deriving the travel resistance Fr from a difference between the computed engine output and detected engine output.

It is also preferable that the first commanding mechanism commands a shift to lower gear position based on the difference of acceleration when the modifying mechanism is modifying the target vehicle speed, and commands a shift to lower gear position based on a difference between the target vehicle speed and detected vehicle speed when the modifying mechanism is not modifying the target vehicle speed.

It is also preferable that the system further comprises a mechanism for determining whether or not the learning mechanism has completed learning the maximum drive torque FB, and a mechanism for commanding the changing-over mechanism to shift to higher gear position when an absolute value of the travel resistance Fr has become less than a predetermined value Fk in case the learning is not complete.

The details as well as other features and advantages of this invention are set forth in the remainder of the specification and are shown in the accompanying drawings.

BRIEF DESCRIPTION OF THE DRAWINGS

FIGS. 7A–7E are diagrams showing relations between road gradient on an ascending slope, estimated value of travel resistance, vehicle speed, gear position and throttle opening.

FIGS. 8A–8E are similar to FIGS. 7A–7E, but showing relations on a descending slope.

FIGS. 12A–12G are diagrams showing variations of road slope, target acceleration, travel resistance estimation value, travel load estimation value, real acceleration, real vehicle speed and shift position on an ascending slope during acceleration control, according to the second embodiment.

FIGS. 13A–13G are diagrams showing variations of road gradient, target acceleration, travel resistance estimation value, travel load estimation value, real acceleration, real vehicle speed and shift position when acceleration control is released on a rising slope, according to the second embodiment.

DESCRIPTION OF THE PREFERRED EMBODIMENTS

Figure 1:
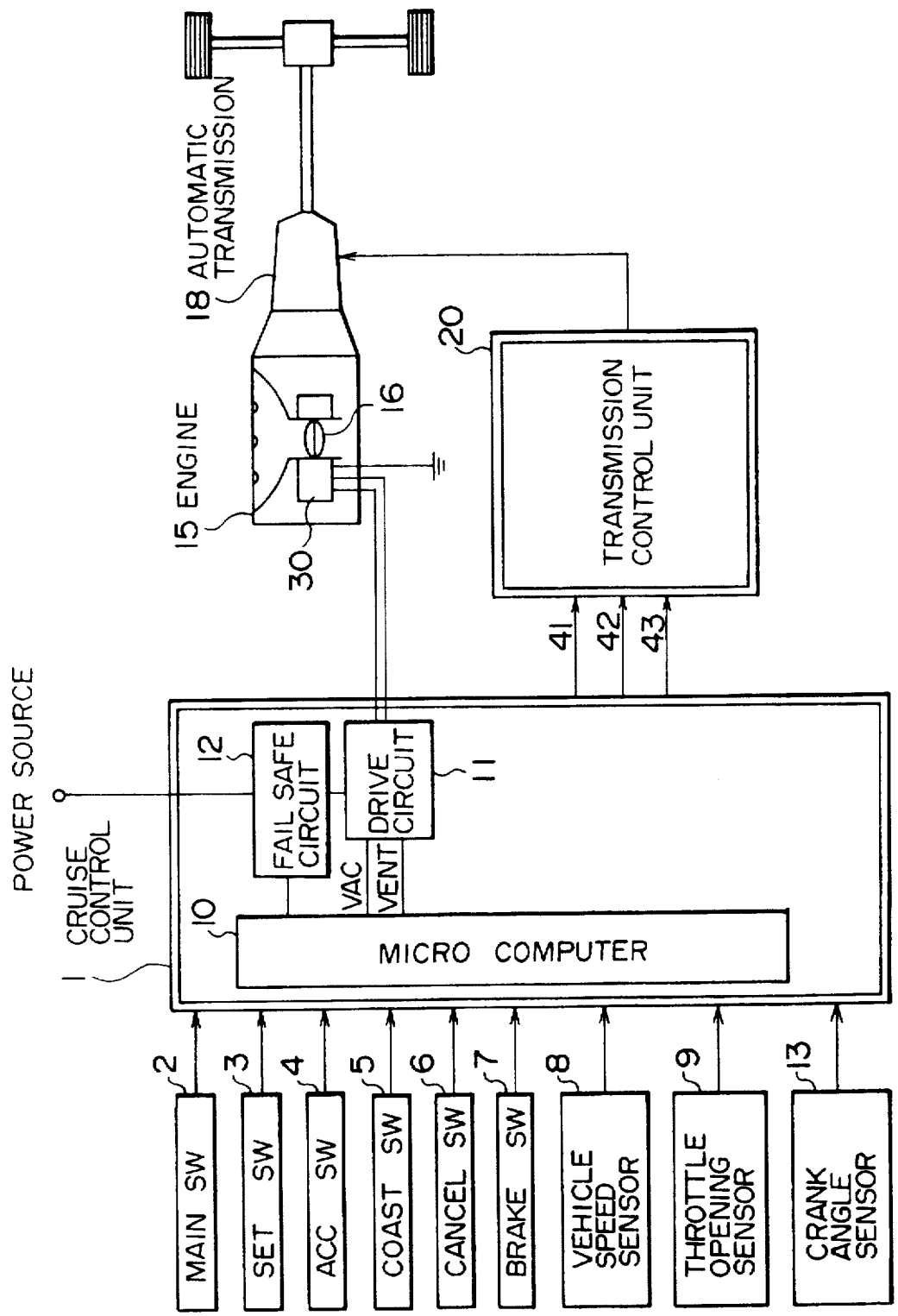
FIG. 1 is a schematic diagram of a cruise control system according to this invention.

Referring to FIG. 1 of the drawings, a cruise control unit 1 for a vehicle comprises a microcomputer 10 comprising a CPU, ROM, RAM, interfaces and timers, and a throttle actuator drive circuit 11.

Signals from switches 2–7 operated by the driver, and from sensors 8, 9 and 13, are input to the control unit 10. The control unit 1 determines the start or discontinuation of cruise control according to operation of the switches 2–7.

The main switch 2 switches the cruise controller ON and OFF. The set switch 3 starts cruise control and sets the vehicle speed. The ACC switch (acceleration switch) 4 issues a command to increase the target vehicle speed. The COAST switch (coasting switch) 5 issues a command to decrease the target vehicle speed. The cancel switch 6 and break switch 7 both release cruise control.

A vehicle speed sensor 8 outputs a pulse signal corresponding to the real speed of the vehicle. The control unit 1 computes the real vehicle speed by counting these pulse signals.

A throttle sensor 9 comprising a potentiometer outputs a signal corresponding to a real throttle opening. The control unit 1 performs drive control of a throttle actuator 30 and estimates travel resistance of the vehicle, described hereinafter.

A crank angle sensor 13 outputs an engine speed Ne.

Figure 2:
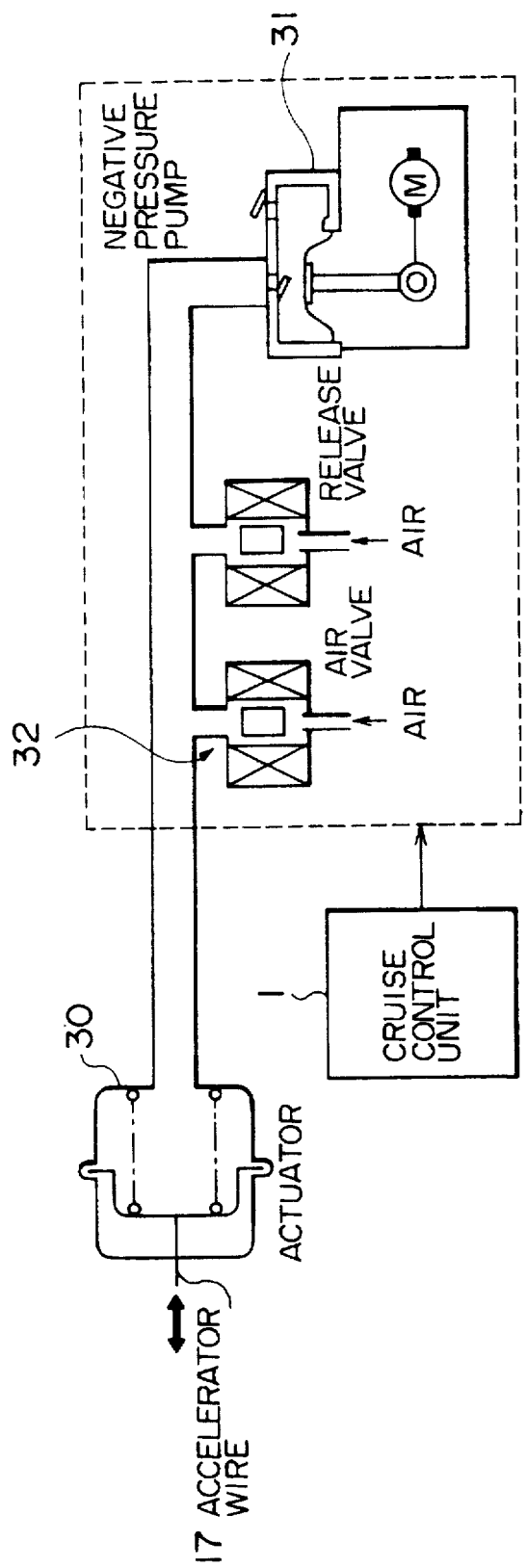
FIG. 2 is a schematic diagram of a throttle actuator of a cruise control system according to this invention.

A throttle 16 for controlling intake air flow is interposed in an intake passage of an engine 15, this throttle 16 being driven by the negative pressure type actuator 30 in response to commands from the control unit 1. The throttle actuator 30 comprises a vacuum pump 31 and atmospheric release valve 32 shown in FIG. 2, and varies the opening of the throttle 16 via an accelerator 17 according to a negative pressure generated by the vacuum pump 31.

An automatic transmission control unit 20 for controlling an automatic transmission 18 is connected to the control unit 1 via signal lines 41-43. The cruise control system performs cruise control only when the gear position of the automatic transmission 18 is in third gear position (D3) or overdrive position (OD).

The automatic transmission control unit 20 sends the gear position during cruise control via the signal line 41, i.e. a signal indicating D3 or OD, to the cruise control unit 1, and the cruise control unit 1 sends a cruise control signal to the control unit 20 via the signal line 42. The cruise control unit 1 also sends an OD cancel request signal during cruising to the control unit 20 via the signal line 43. Exchange of signals between the control units 1 and 20 via the signal lines 41-43 takes place in parallel.

Figure 3A:
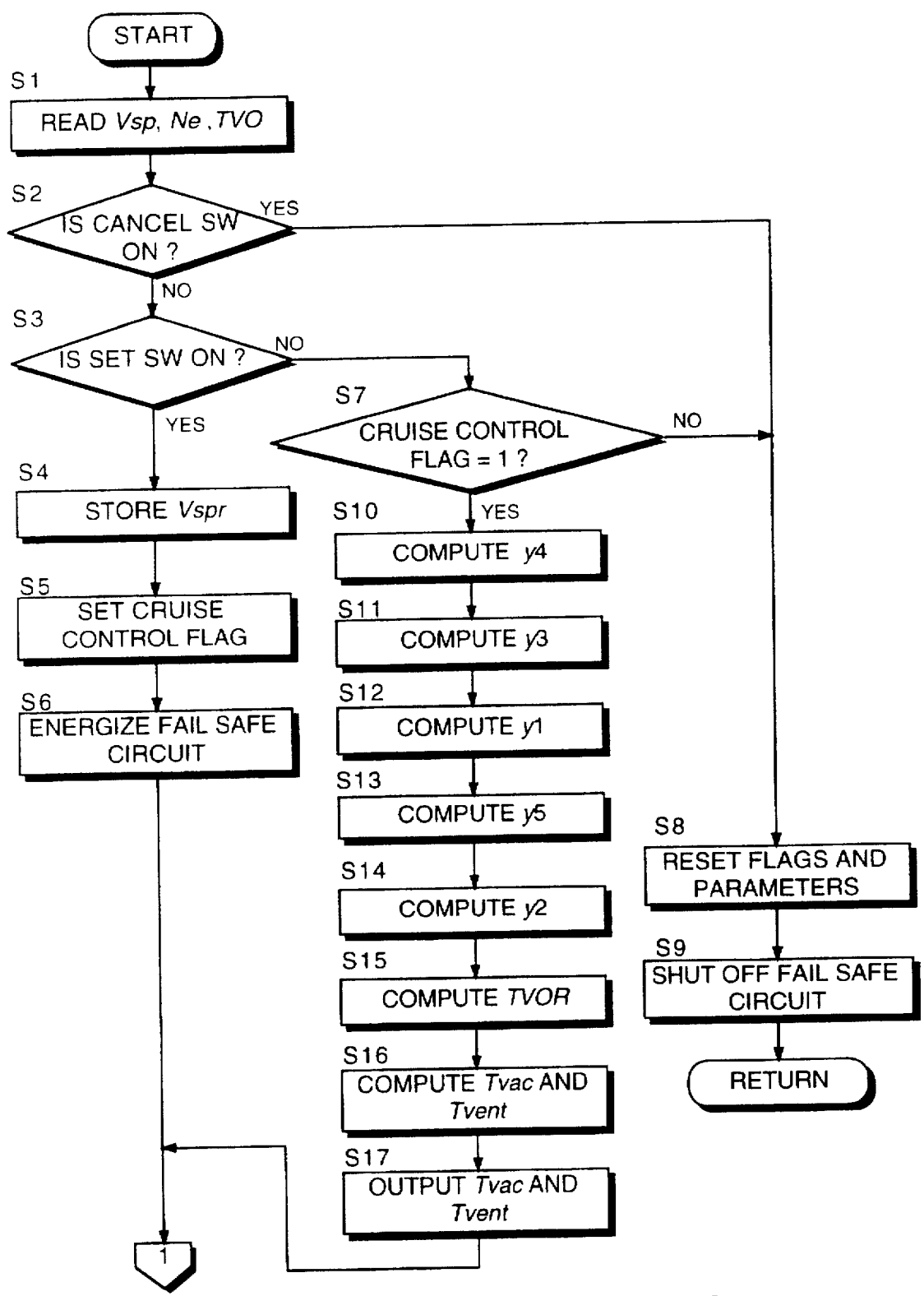
FIGS. 3A, 3B are flowcharts showing a cruise control process according to this invention.
Figure 3B:
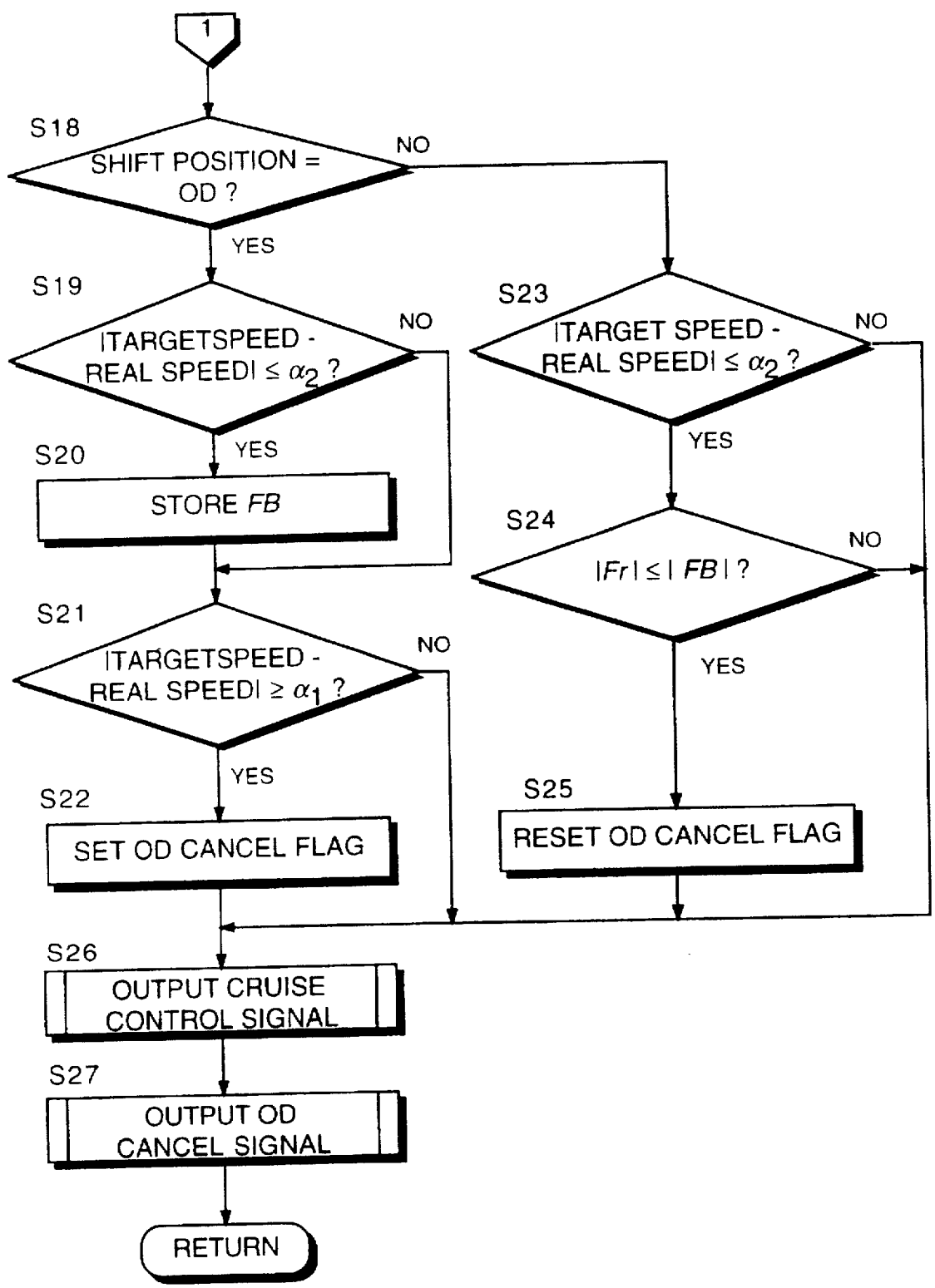

The control unit 1 performs the cruise control shown by the flowcharts of FIGS. 3A, 3B, for example every 100 msec, according to a timer or the like. The control process will now be described with reference to these flowcharts.

First, in a step S1, signals are read from the vehicle speed sensor 8, throttle sensor 9 and crank angle sensor 13. An average real vehicle speed Vsp, throttle opening TVO and engine speed Ne are then computed from these signals counted during the predetermined interval of 100 msec.

In a step S2, it is determined whether the cancel switch 6 (or break switch 7) is ON so as to decide whether to continue or to discontinue cruise control. When cruise control is to be discontinued, the routine proceeds to a step S8 and subsequent steps, and when cruise control is to be continued, the routine proceeds to a step S3.

In the step S3, it is determined whether or not the set switch 3 is ON. When it is ON, the routine proceeds to a step S4 for setting a target vehicle speed Vspr, and when it is OFF, the routine proceeds to a step S7.

In the step S4, the current real vehicle speed Vsp is stored as the target vehicle speed Vspr, a cruise control flag is set to 1 in a step S5, and a failsafe power supply shutoff circuit 12 is set to an energized state.

When the set switch 3 is OFF in the step S3, the processing of step S7 and subsequent steps is performed, and cruise control is performed based on the target vehicle speed Vspr which was set up on the immediately preceding occasion.

After checking whether the cruise control flag is 1 in the step S7, the routine proceeds to a step S10. When the cruise control flag is not 1, various flags and parameters are reset in the step S8, energization of the failsafe power supply shutoff circuit 12 is stopped in a step S9, and the process is terminated.

Figure 4A:
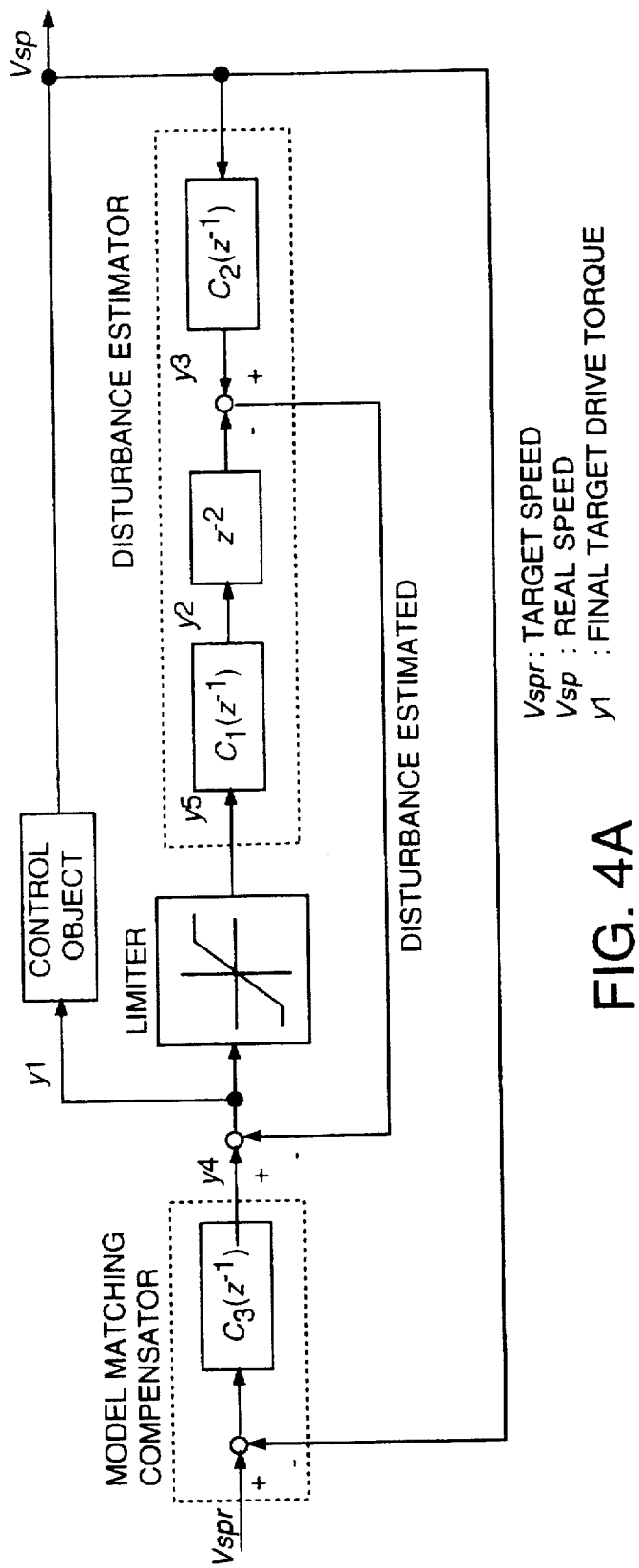
FIGS. 4A, 4B are block diagrams showing a construction of a feedback control compensator according to this invention.

In steps S10-S14, in order to make the target vehicle speed Vspr coincide with the real vehicle speed Vsp, a target engine drive torque yl is computed by the "model matching method" and "zero approximation method", which are linear control methods known in the art, using a compensator shown in FIG. 4A.

First the modelization of a vehicle controlled by the vehicle cruise control system, this vehicle incorporating a compensator, will be described.

Figure 5:
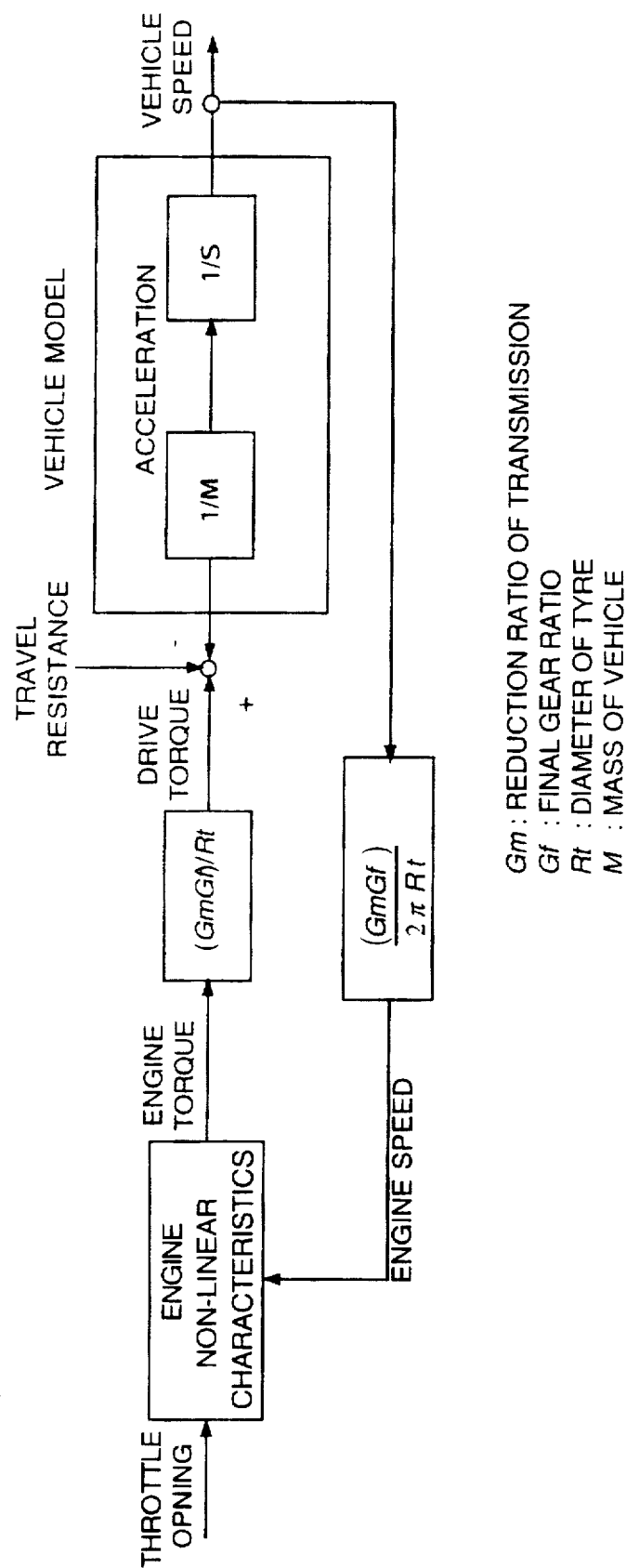
FIG. 5 is a block diagram showing a simple non-linear model of a vehicle power train according to this invention.

The behavior of a vehicle power train may be represented by the simple non-linear model shown in FIG. 5. In this model, the transient characteristics of an engine and torque converter with a relatively fast response, and the non-linear steady-state characteristics of the torque converter, are omitted.

Figure 6:
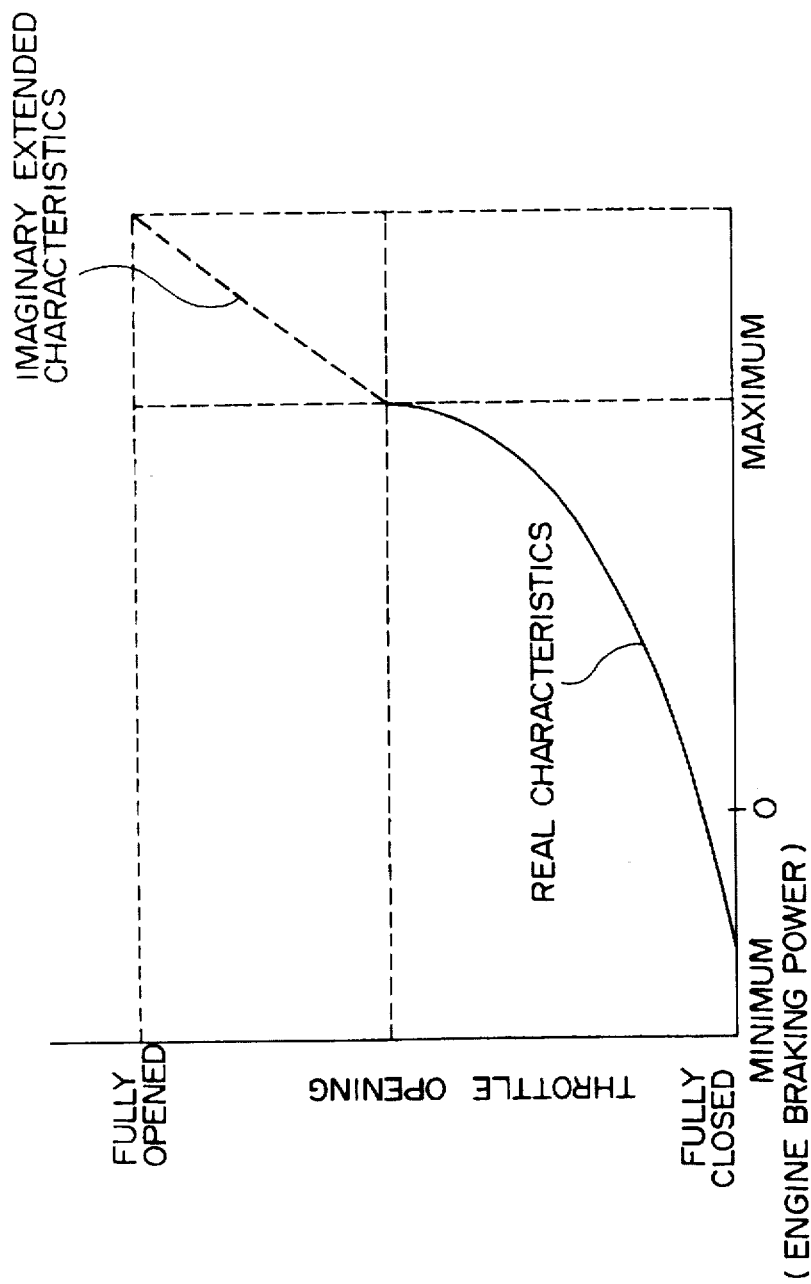
FIG. 6 is a diagram showing engine non-linear characteristics related to throttle opening and engine torque.

The case will be considered wherein a throttle opening command value such that the real drive torque coincides with a target drive torque, is computed using an engine non-linear compensation map shown in FIG. 6, and the non-linear steady state engine characteristics are rendered linear by servo control of the throttle opening.

In this case, a control model for inputting a target drive torque and outputting a vehicle speed has characteristics of integration. In the compensator, the transmission characteristics in this model are expressed by a pulse transmission function $P(z^{-1})$.

In FIG. 4A, z is a delay computation element, and $z^{-1}$ is the value of z in the immediately preceding sampling period.

Figure 4B:

$C1(z^{-1})$, $C2(z^{-1})$ are disturbance estimators in the zero approximation method which suppress the effect of disturbance and modeling errors. $C3(z^{-1})$ is a compensator in the model matching method which is set so that the response characteristics of the object under control when the target vehicle speed in input and the real vehicle speed is output, coincides with the characteristics of a standard model $H(z^{-1})$ having a predetermined first order delay and an ineffectual time, as shown in FIG. 4B. The disturbance estimators shown in FIG. 4A estimate the travel resistance (required drive torque) necessary to maintain the target vehicle speed. In computing the target engine torque, a gear ratio is chosen according to the shift position such that a travel resistance estimation value Fr is not affected by the shift position.

In practice, the transmission characteristics of the object under control must take account of ineffectual time, i.e. the delay in the power train, and according to this embodiment, it is understood that there will be about two sampling periods (200 msec). The pulse transmission function $P(z^{-1})$ may therefore be expressed by the product of an integral element $P1(z^{-1})$ given by the following equation, and an ineffectual time element $P2(z^{-1})$.

$$P1(z^{-1}) = \frac{T \cdot z^{-1}}{M \cdot (1 - z^{-1})} \quad (1)$$

where,

T=sampling period=100 msec and

H=mean vehicle weight $C1(z^{-1})$, $C2(z^{-1})$ are then given by the following equations.

$$C1(z^{-1}) = \frac{(1-\gamma) \cdot z^{-1}}{1 - \gamma \cdot z^{-1}} \text{ (low pass filter of time contant } Tb) \quad (2)$$

$$C2(z^{-1}) = \frac{M \cdot (1-\gamma) \cdot (1 - z^{-1})}{T \cdot (1 - \gamma \cdot z^{-1})} \quad (3)$$

where, $C2 = \frac{C1}{P1}$ and $\gamma = \exp\left(\frac{-T}{Tb}\right)$

The compensator C2 is the result of the reciprocal of the vehicle model multiplied by the low pass filter. The drive torque corresponding to the real vehicle speed Vsp, i.e. a value obtained by subtracting the travel resistance from the drive torque, may thus be found.

Further ignoring the ineffectual time of the object under control, setting the standard model $H(z^{-1})$ equal to a first order low pass filter of a time constant Ta, C3 becomes a constant as follows.

$$C3 = K = \left\{ 1 - \exp\left(\frac{-t}{Ta}\right) \right\} \cdot \frac{M}{T} \quad (4)$$

In the step S10 based on the aforesaid control procedure, the following computation is performed corresponding to a model matching compensator, and a target drive torque y4 is calculated. Herein, y(k−1) represents the value of data y(k) in the immediately preceding sampling period.

$$y4(k) = K \cdot \{Vspr(k) - Vsp(k)\} \quad (5)$$

In a step S11, the following computation corresponding to the compensator $C2(z^{-1})$, which is part of the disturbance estimators, is performed.

$$y3(k) = \gamma \cdot y3(k-1) + (1-\gamma) \cdot \frac{M}{T} \cdot Vsp(k) - (1-\gamma) \cdot \frac{M}{T} \cdot Vsp(k-1) \quad (6)$$

In a step S12, the target drive torque y4 is corrected by the following equation, and the final target drive torque y1 is found. y2(k−2) is the value of y(k) two sampling periods before which is calculated in a step S14 described hereinafter. The computation of the step S14 corresponds to the aforesaid integral element $P1(z^{-1})$, while the use of data two sampling periods before corresponds to the aforesaid ineffectual time element $P2(z^{-1})$.

$$y1(k) = y4(k) - y3(k) + y2(k-2) \quad (7)$$

Whereas y2(k−2) is a drive torque not affected by the travel resistance calculated in the compensator, y3(k) is a value obtained by subtracting the travel resistance from the drive torque, so y2(k−2)−y3(k) is the travel resistance estimation value Fr.

$$Fr = y2(k-2) - y3 \quad (8)$$

In a step S13, a maximum engine torque Temax and a minimum engine torque Temin are first calculated using stored tabular data for each engine speed when the throttle is fully open and when it is fully closed. A maximum drive torque Fmax and minimum drive torque Fmin are also calculated by the following equations.

$$Fmax = \frac{temax \cdot Gm \cdot Gf}{Rt} \quad (9)$$

$$Fmin = \frac{temin \cdot Gm \cdot Gf}{Rt} \quad (10)$$

where,

Gm is a transmission gear ratio,

Gf is a final gear ratio and

Rt is an effective tire radius.

The final target drive torque y1(k) is also limited by these upper limits Fmax and Fmin, and y5(k) is calculated.

In a step S14, the following calculation corresponding to the compensator $C1(z^{-1})$ which is part of the perturbation estimator, is performed.

$$y2(k) = \gamma \cdot y2(k-1) + (1-\gamma) \cdot y5(k-1) \quad (11)$$

In a step S15, a target engine torque Ter is first computed from the final target drive torque y1(k).

$$Ter = \frac{y1 \cdot Rt}{Gm \cdot Gf} \quad (12)$$

A target throttle opening is also found from the engine speed Ne and target engine torque Ter using a preset engine non-linear data map. In this computation, an extended data map as shown in FIG. 6 is used so that the engine torque corresponds without fail to the whole range of throttle openings. The solid line in the figure represents the original engine characteristics, and the dotted line represents extended data.

In a step S16, an output pulse width Tvac to the vacuum pump of the throttle actuator 30 and an output pulse width Tvent to the solenoid valve used for atmospheric venting, are computed based on a throttle opening difference (=target opening TVOR−real opening TVO) using a known control method such as PID control.

In a step S17, these pulse widths Tvac and Tvent are set in predetermined output registers.

In a step S18, it is determined whether or not the shift position of the automatic transmission is OD. When it is OD, the routine proceeds to a step S19, and when it is not OD, the routine proceeds to a step S23. The determination of this shift position is performed by a LO/HI level of the signal line 41 which indicates the OD shift situation of the automatic transmission.

In a step S19, the absolute value of the difference of the target vehicle speed and real vehicle speed is compared with a second predetermined value $\alpha_2$. When this absolute value is equal to or less than $\alpha_2$, it is determined that the target vehicle speed is effectively maintained (travel resistance and drive torque are effectively in equilibrium), and the routine proceeds to a step S21. When this absolute value exceeds $\alpha_2$, it is determined that the travel resistance is increasing, and the routine proceeds to a step S20. This drive torque also comprises a negative drive torque due to engine braking (=braking torque).

In the step S20, the travel resistance estimation value Fr computed in equation (8) of the aforesaid step S12 is stored as an OD maximum drive torque learning stored value FB. As the vehicle speed difference is still small, the throttle opening does not comprise an opening due to acceleration for canceling the vehicle speed difference, so the travel resistance estimation value Fr computed at this time represents the road gradient.

The second predetermined value $\alpha_2$ is set at a smaller value than the first predetermined value $\alpha_1$ described hereinafter, and the travel resistance estimation value Fr at this predetermined value $\alpha_2$ is stored as the learning stored value FB of the maximum drive torque at the OD position.

In the step S21, the absolute value of the difference of the target vehicle speed and real vehicle speed is compared with the first predetermined value $\alpha_1$. When this absolute value is equal to or greater than the predetermined value $\alpha_1$, it is determined that there should be a shift to lower gear and the routine proceeds to a step S22. When the absolute value is less than the predetermined value $\alpha_1$, the routine proceeds to a step S26.

In the step S22, an OD cancel flag is set, and the automatic transmission is requested to shift to lower gear from OD.

In the determination of the step S18, when the automatic transmission is not in the OD position, the routine proceeds to a step S23, and the absolute value of the difference between the target vehicle speed and real vehicle speed is compared with the predetermined value $\alpha_2$. When the absolute value of the difference is equal to or less than the predetermined value $\alpha_2$, it is considered that the target vehicle speed is effectively maintained or that the real vehicle speed has returned to within a predetermined cruise speed range, and the routine proceeds to a step S24. When this is not the case, the routine proceeds to a step S26.

In the step S24, the absolute value of the travel resistance estimation value Fr computed in the step S12, is compared with the absolute value of the OD maximum drive torque learning stored value FB stored in the step S20. When the absolute value of the travel resistance estimation value Fr is no greater than the absolute value of the OD maximum drive torque learning stored value FB, it is determined that the road gradient has returned to a level at which the target vehicle speed can be maintained in the OD position, and the routine proceeds to a step S25. When this is not the case, the routine proceeds to the step S26.

In the step S25, the OD cancel flag is reset.

Hence, according to the travel conditions, the OD cancel flag is set in the step S22 or reset in the step S25, and the process proceeds to the step S26.

In the step S26, an interface register corresponding to the signal line 42 to the automatic transmission control unit 20 is set based on the cruise control flag.

Next, in a step S27, an interface register corresponding to the signal line 43 to the automatic transmission control unit is set based on the OD cancel flag.

When the vehicle has been climbing the slope shown in FIG. 7A, the gradient increases from a point A. When the vehicle speed difference has reached the predetermined value $\alpha_2$ at a point B as shown in FIG. 7C, it is determined that the maximum drive torque and travel resistance coincide in OD, and the travel resistance estimation value Fr at that time is stored as an OD maximum drive torque FB shown in FIG. 7B.

As the vehicle speed difference is still small, the throttle opening does not comprise an opening due to acceleration for canceling the vehicle speed difference, so the travel resistance estimation value Fr computed at this time is identical to the road slope.

As the vehicle continues to climb the slope, at a point C when the gradient has increased to a predetermined angle, the vehicle speed difference has reached $\alpha_1$, it is determined that the vehicle speed cannot be maintained in this shift position, and a decision is made to shift to lower gear.

After shifting down to third gear, there is excess drive torque, so the throttle opening is decreased as shown in FIG. 7E. The vehicle speed also decreases, and at a point D, the vehicle speed difference falls below $\alpha_2$ as shown in FIG. 7C.

The road gradient however still has a predetermined angle, and the travel resistance maintains an increased value depending on the gradient.

From a point E, the gradient E decreases and the travel resistance also decreases. At the points D, E, F, there is no vehicle speed difference, so the computed travel resistance estimation value Fr is identical to the real road gradient.

After the travel resistance estimation value Fr has decreased to less than the OD maximum drive torque learning stored value FB at the point F, it is determined that the road gradient has returned to a level at which the target vehicle speed can be maintained in the OD position, and a decision is made to shift to higher gear.

In this way, it is detected without fail that the road gradient has returned to a level at which the target vehicle speed can be maintained in the OD position, so large decelerations on steep slopes are prevented and shift hunting is definitively avoided.

FIGS. 8A–8E show the situation on a descending slope. The descent gradient increases from a point A shown in FIG. 8A. As shown in FIG. 8C, when the vehicle speed difference has reached a predetermined value $\alpha_2$ at a point B, it is determined that the maximum drive torque in OD (negative drive torque due to engine braking=braking torque) is identical to the travel resistance, hence the travel resistance estimation value Fr is stored as the OD maximum drive torque FB as shown in FIG. 8B. However, if OD cancel occurred at this point, the driver would experience an unpleasant sensation as the vehicle speed difference is still small, so OD is not canceled.

As the vehicle continues to descend, the vehicle speed difference reaches the predetermined value $\alpha_1$ at a point C when the gradient has reached a predetermined angle, so a decision is made to shift to lower gear as shown in FIG. 8D.

After shifting down to third gear (D3), there is excess braking torque, the vehicle speed difference decreases, and at a point D, the vehicle speed difference decreases to less than $\alpha_2$.

The road gradient however still has a predetermined angle, and the travel resistance maintains a decreased value depending on the gradient.

From a point E, the gradient increases and the travel resistance also increases as shown in FIG. 8B.

After the travel resistance estimation value Fr has increased to higher than the OD maximum drive torque learning stored value FB, it is determined that the road gradient has returned to a level at which the target vehicle speed can be maintained in the OD position, and a decision is made to shift to higher gear.

In this way, it is detected without fail that the road gradient has returned to a level at which the target vehicle speed can be maintained in the OD position, so large accelerations on steep descents are prevented and shift hunting is definitively avoided.

In the aforesaid embodiment, the predetermined values $\alpha_1$, $\alpha_2$ do not depend on the vehicle. Tuning is unnecessary, as they can be applied to various types of vehicle.

In the aforesaid step S24, it was assumed that |travel resistance estimation value|≦|learned value|, however if hysteresis is introduced when there is a shift to higher gear after a shift down by setting |travel resistance estimation value|≦|learned value|+β, shift hunting can be avoided even more definitively.

A second embodiment of this invention will now be described with reference to FIGS. 9A–17G. In order to make a distinction, the embodiment described above will be referred to hereinafter as the first embodiment.

Figure 9A:
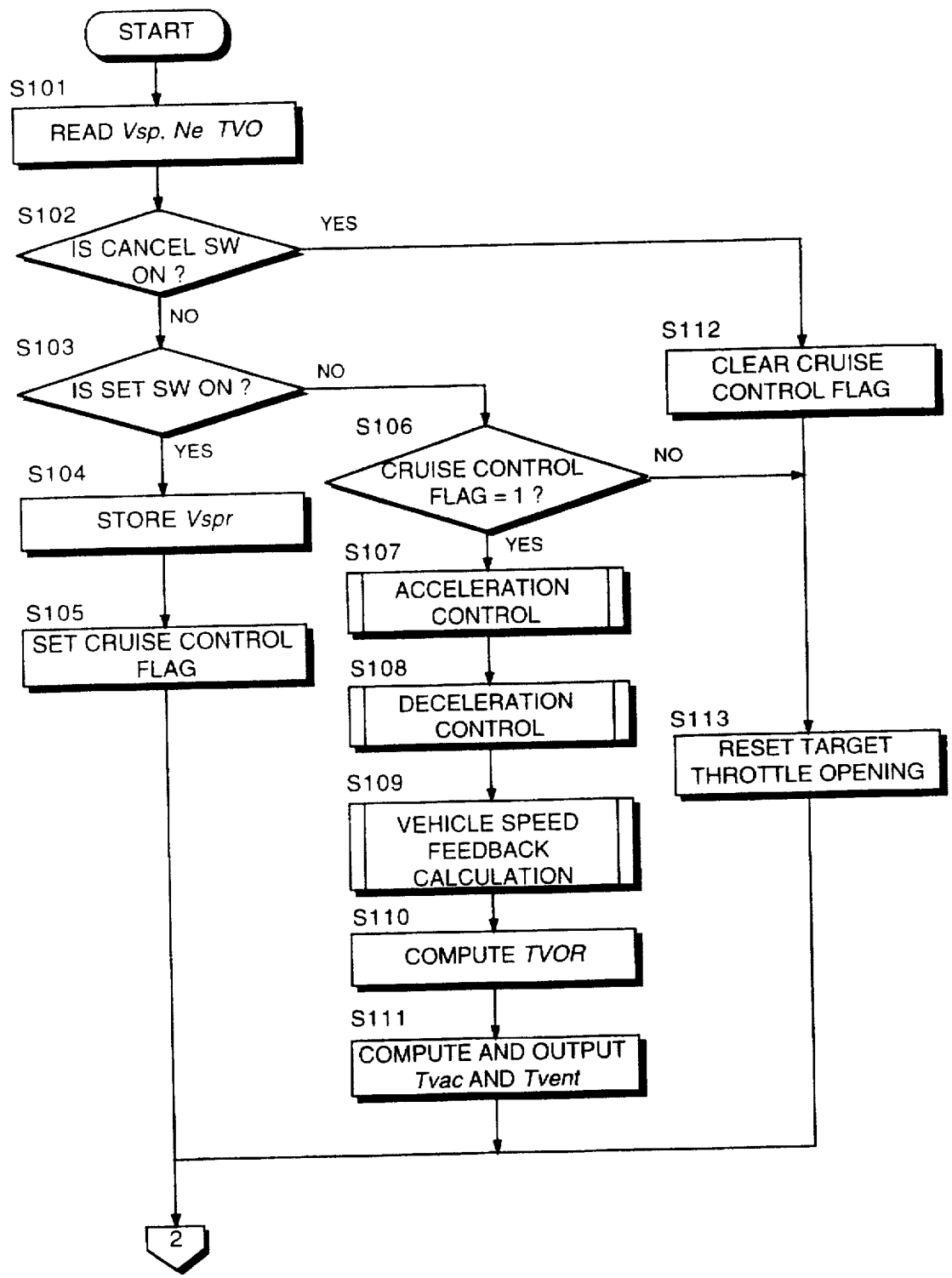
FIGS. 9A, 9B are flowcharts showing a part of a cruise control process according to a second embodiment of this invention.
Figure 9B:
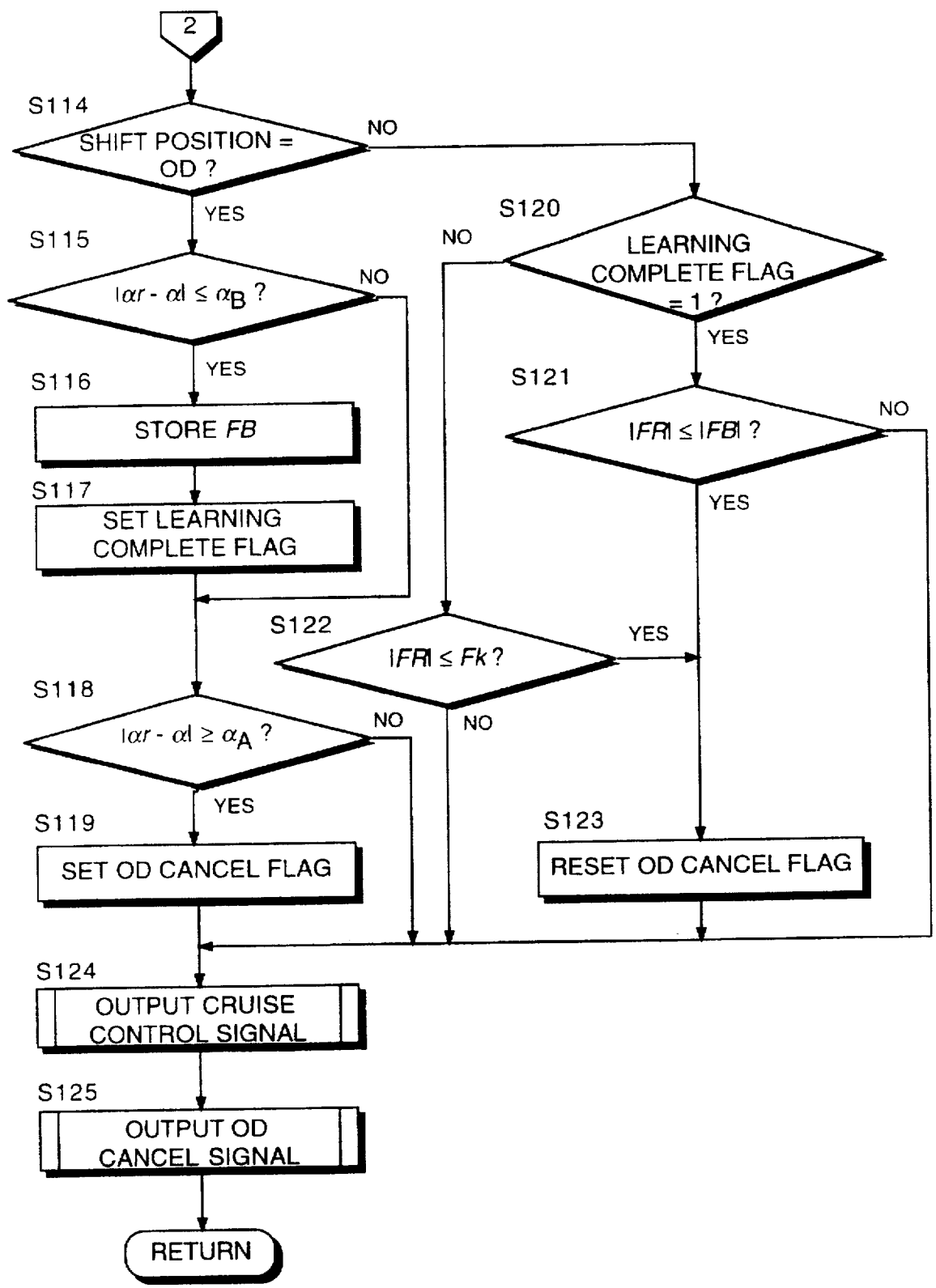

FIGS. 9A, 9B show alternative forms of the control process in FIGS. 3A, 3B. This process is executed according to a timer, e.g. at intervals of 50 msec.

Steps S101–S105 are identical to the steps S1–S5 of FIG. 3A.

When the cancel switch 6 is ON in the step S102, the cruise speed control flag is cleared to 0 in a step S112, the target throttle opening is reset in a step S113, and the routine proceeds to a step S114 and subsequent steps in FIG. 9B described hereinafter.

When the cancel switch 6 is OFF in the step S102 and the set switch 3 is OFF in the step S103, the routine proceeds to a step S106.

In the step S106, it is determined whether or not the cruise control flag is 1. When the cruise control flag is not 1, as in the case when the cancel switch 6 is ON, cruise control is not performed and the routine proceeds to the step S114 and subsequent steps via the step S113.

Cruise control is performed in the steps S107–S111.

Figure 10:
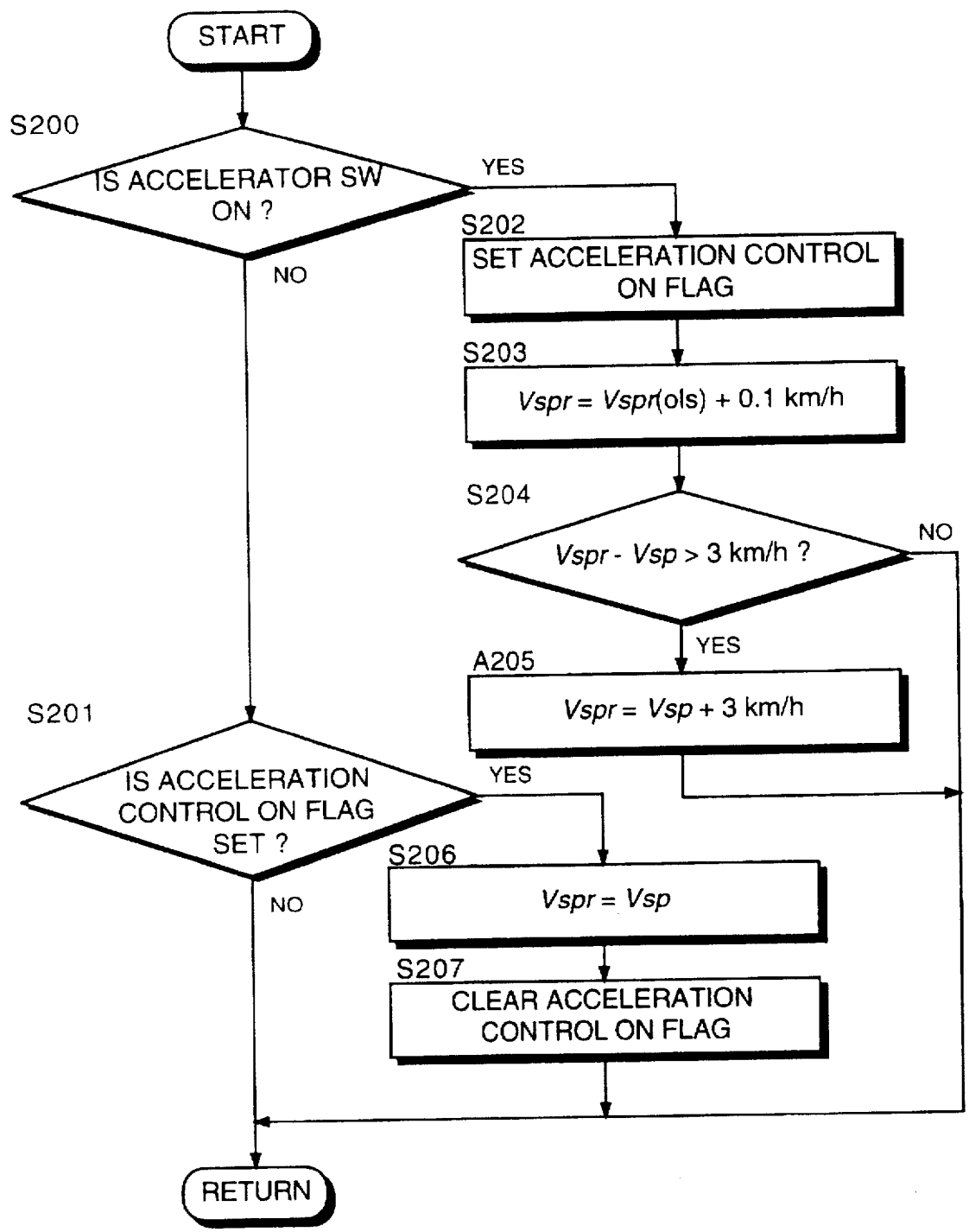
FIG. 10 is a flowchart showing a sub-routine of an acceleration process according to the second embodiment.

First, in the step S107, the subroutine in a step S200 and subsequent steps shown in FIG. 10 is executed and acceleration control is performed. These subroutines will be described hereinafter.

Figure 11:
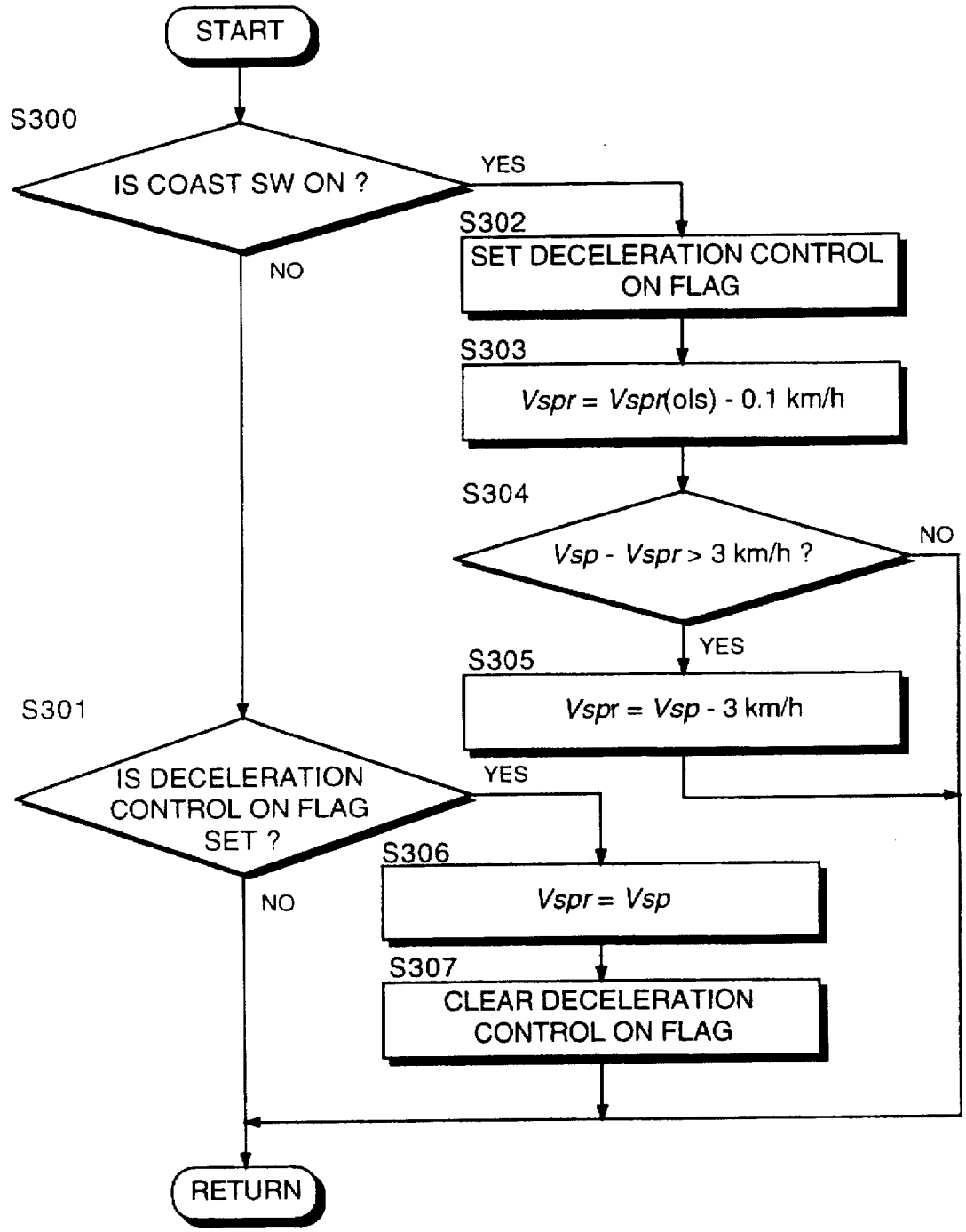
FIG. 11 is a flowchart showing a sub-routine of an deceleration process according to the second embodiment.
Figure 14A:
FIGS. 14A–14G are diagrams showing variations of road gradient, target acceleration, travel resistance estimation value, travel load estimation value, real acceleration, real vehicle speed and shift position on a descending slope during deceleration control, according to the second embodiment.
Figure 14B:
Figure 14C:
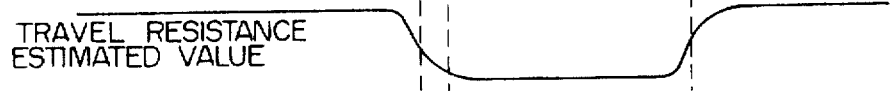
Figure 14D:
Figure 14E:
Figure 14F:
Figure 14G:
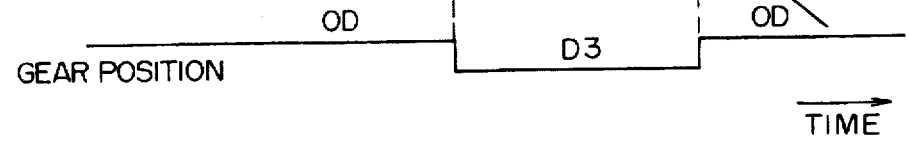
Figure 15A:
FIGS. 15A–15G are diagrams showing variations of road gradient, target acceleration, travel resistance estimation value, travel load estimation value, real acceleration, real vehicle speed and shift position when deceleration control is released on a descending slope, according to the second embodiment.
Figure 15B:
Figure 15C:
Figure 15D:
Figure 15E:
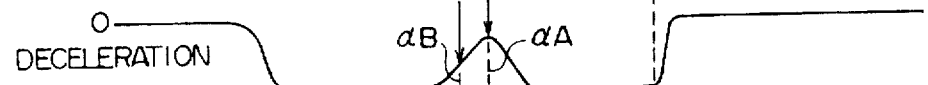
Figure 15F:
Figure 15G:
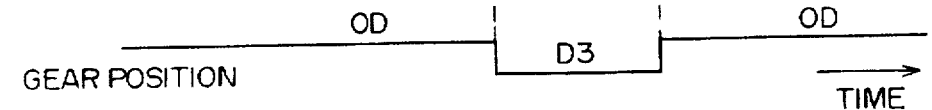

In the step S108, the subroutine in the step 300 and subsequent steps shown in FIG. 11 is executed, and deceleration control is performed. This subroutine will be described hereinafter.

This acceleration control or deceleration control is not performed by the accelerator, and applies only when the value of the cruise speed is increased or decreased.

In a step S109, as in the steps S10–S14 of FIG. 3A, the target drive torque y1 and travel resistance estimation value Fr are computed according to the vehicle speed. The travel load estimation value FR is also calculated by adding the drive torque or braking torque required for acceleration or deceleration to this travel resistance estimation value Fr.

This is found by adding the product of multiplying an acceleration or deceleration αr by a basic vehicle weight W, to the value Fr found in equation (8) as shown below.

$$FR = Fr + W \cdot \alpha r \tag{13}$$

In the step S110, a target throttle opening TVO is computed as in the case of the step S15. Then in the step S111, an output pulse width Tvac to the vacuum pump of the throttle actuator 30 and an output pulse width Tvent to the solenoid valve used for atmospheric venting, are computed according to this target throttle opening TVO, and these values are set in predetermined registers.

The acceleration control and deceleration control subroutines executed in the steps S107, S108 will now be described.

The acceleration control process is shown in FIG. 10.

First, in the step S200, it is determined whether or not the accelerator switch is ON. When it is ON, the routine proceeds to a step S202 to perform acceleration control, and when it is OFF, the routine proceeds to a step S201.

When acceleration control is performed, an acceleration control ON flag is set in the step S202. In a step S203, the target vehicle speed Vspr is set to a value obtained by adding a predetermined value to the immediately preceding value, i.e. a target vehicle speed Vspr (old) in the immediately preceding cycle. Herein, +0.1 km/hour is added.

When the execution period of the routine is 50 msec and the value added to the target vehicle speed is 0.1 km/hour, the target acceleration αr due to acceleration control=2 km/hour/sec.

In a step S204, it is determined whether or not the difference between the target vehicle speed Vspr and real vehicle speed Vsp exceeds a tolerance value. Herein, the tolerance value is 3 km/hour.

When the difference exceeds the tolerance value, the routine proceeds to a step S205. When the difference is within the tolerance value, the subroutine is terminated.

In the step S205, a value obtained by adding the difference tolerance value of 3 km/h to the real vehicle speed Vsp is set as the target vehicle speed Vspr, and the subroutine is terminated.

When it is determined that the selector switch 4 is OFF in the step S200, it is determined in the step S201 whether or not the acceleration control ON flag is set. When the acceleration control ON flag is not set, the subroutine is terminated at this point.

When the acceleration control ON flag is set, the current real vehicle speed Vsp is set to the target vehicle speed Vsp in a step S206, and acceleration control is terminated by clearing the acceleration control ON flag to 0 in a step S207.

The deceleration control process is shown in FIG. 11.

First, in the step S300, it is determined whether or not a coast switch 5 is ON. When it is ON, the routine proceeds to a step S302 to perform deceleration control, and when it is OFF, the routine proceeds to a step S301.

When deceleration control is performed, a deceleration control ON flag is set in the step S302. In a step S303, the target vehicle speed Vspr is set to a value obtained by subtracting a predetermined value from the immediately preceding value, i.e. a target vehicle speed Vspr (old) in the immediately preceding cycle. Herein, 0.1 km/hour is subtracted.

When the execution period of the routine is 50 msec and the value subtracted from the target vehicle speed is 0.1 km/hour, the target deceleration αr due to deceleration control=−2 km/hour/sec.

In a step S304, it is determined whether or not the difference between the target vehicle speed Vspr and real vehicle speed Vsp exceeds a tolerance value. Herein, the tolerance value is 3 km/hour.

When the difference exceeds the tolerance value, the routine proceeds to a step S305. When the difference is within the tolerance value, the subroutine is terminated.

In the step S305, a value obtained by subtracting the difference tolerance value of 3 km/hour from the real vehicle speed Vsp is set as the target vehicle speed Vspr, and the subroutine is terminated.

When it is determined that the coast switch 5 is OFF in the step S300, it is determined in the step S301 whether or not the deceleration control ON flag is set. When the deceleration control ON flag is not set, the subroutine is terminated at this point.

When the deceleration control ON flag is set, the current real vehicle speed Vsp is set to the target vehicle speed Vspr in a step S306, and deceleration control is terminated by clearing the deceleration control ON flag to 0 in a step S307.

In this way, in the steps S107, S108, the travel load estimation value FR which includes an acceleration or deceleration is computed.

After terminating the processing of FIG. 9A, the routine proceeds to the step S114 of FIG. 9B, and learning control of the automatic transmission is performed based on the travel load estimation value FR.

In the step S114, it is determined whether or not the automatic transmission is set to the OD position. When it is in the OD position, the routine proceeds to a step S115. When it is not in the OD position, the routine proceeds to a step S120. The shift position of the automatic transmission is determined by a LO/HI level of the signal line 41 showing its OD shift status.

In the step S115, the absolute value of the difference between the target acceleration αr and the real acceleration α is compared with a second predetermined value $\alpha_B$. When the absolute value is equal to or less than this predetermined value $\alpha_B$, it is determined that the target acceleration αr is effectively maintained (travel load and drive torque are effectively in equilibrium), and the routine proceeds to a step S116. When this absolute value exceeds the predetermined value $\alpha_B$, it is determined that the travel resistance is increasing, and the routine proceeds to a step S118. The real acceleration α used in this computation is obtained from the differential of the real vehicle speed Vsp. The above drive torque also comprises a negative drive torque due to engine braking (=braking torque).

In the step S116, the travel load estimation value FR computed in equation (13) of the aforesaid step S109 is stored as an OD maximum drive torque learning stored value FB.

Herein, the second predetermined value $\alpha_B$ is set to a smaller value than a predetermined value $\alpha_A$ described hereinafter, the travel load estimation value FR in the travel state before the shift to lower gear based on this predetermined value $\alpha_B$ is stored as the OD maximum drive torque learning stored value FB, and a learning complete flag is set to 1 in a step S117.

In the step S118, the absolute value of the difference of the target acceleration αr and the real acceleration α is compared with the first predetermined value $α_A$. When this absolute value is equal to or greater than the predetermined value $α_A$, it is determined that there should be a shift to lower gear and the routine proceeds to a step S119. When the absolute value is less than the predetermined value $α_A$, the routine proceeds to a step S124.

In the step S119, the OD cancel flag is set to 1, and the automatic transmission is requested to shift to lower gear from OD.

In the determination of the step S114, when the automatic transmission is not in the OD position, the routine proceeds to the step S120, and it is determined whether or not the learning complete flag is set to 1. When the flag is 1, the routine proceeds to a step S121. When the flag is not 1, it means that the absolute value of the acceleration difference in the step S115 has exceeded the predetermined value $α_B$. In this case, the routine proceeds to a step S122.

In the step S121, the absolute value of the travel load estimation value FR computed in the step S109 is compared with the absolute value of the OD maximum drive torque learning stored value FB stored in the step S116. When the absolute value of the travel load estimation value FR is equal to or less than the absolute value of the OD maximum drive torque learning stored value FB, it is determined that the road gradient has returned to a level at which the target acceleration can be maintained in the OD position, and the routine proceeds to a step S123.

In the step S123, the OD cancel flag is reset to 0, and a request is issued to shift up to OD.

When the absolute value of the travel load estimation value FR is greater than the absolute value of the OD maximum drive torque learning stored value FB, the OD cancel flag is maintained in its set state, and the routine proceeds to a step S124 while the current shift down position is maintained.

When the learning complete flag is not 1 in the step S120, the routine proceeds to the step S122, and the absolute value of the travel load estimation value FR computed in the step S109 is compared with a predetermined value Fk preset in storage means such as a ROM, not shown. When the absolute value of the travel load estimation value FR is equal to or less than the predetermined value Fk, it is determined that the road gradient has returned to a level at which the target acceleration can be maintained in the OD position. In this case, the OD cancel flag is reset to 0 in the step S123, and a request is issued to shift up to OD. When the absolute value of the travel load estimation value FR is greater than the predetermined value Fk, the OD cancel flag is maintained in its set state, and the routine proceeds to a step S124 while the current shift down position is maintained. The predetermined value Fk corresponds to the maximum drive torque in the OD position preset according to the state of the vehicle.

In the step S124, an interface register corresponding to the signal line 42 to the automatic transmission control unit 20 is set based on the cruise control flag.

Subsequently, a request is issued to shift to higher gear, shift to lower gear or maintain shift position by setting an interface register corresponding to the signal line 43 to the automatic transmission control unit based on the OD cancel flag, in a step S125.

As a result of the aforesaid control, even when the travel resistance (road gradient) increases during acceleration control or deceleration control, and the target acceleration αr cannot be maintained, a suitable shift from OD to lower gear takes place without causing shift hunting.

For example, consider the case shown in FIG. 12A where acceleration control begins at a point A, the road climbs starts to climb steeply from an intermediate point B, and the road gradient gradually increases. In this case the real acceleration α decreases, the absolute value of the difference between the real acceleration α and target acceleration αr becomes equal to the predetermined value $α_B$ at a point C as shown in FIG. 12E, and the target acceleration αr (shown in FIG. 12B) can no longer be maintained by acceleration control.

At this point it is determined that the maximum drive torque attainable in the OD shift position has been reached, and the travel load estimation value FR including an acceleration (shown in FIG. 12D) is stored as the OD maximum drive torque learning value FB.

FIG. 12C is a travel resistance estimation value which does not include an acceleration.

However if a shift from OD to lower gear were made at this point, the driver would experience an unpleasant sensation as the acceleration difference is still small, so the OD position is maintained at this stage.

A shift from the OD position to lower gear is made only at a point D at which the absolute value of the difference between the real acceleration α and target acceleration αr has further increased to $α_A$. Herein, a shift down is made to third gear (D3) as shown in FIG. 12G.

Also the road gradient becomes constant from the point D, there is excess drive torque due to the shift down to third gear, and the real acceleration α returns to the target acceleration αr.

The road gradient gradually decreases from a point E, and at a point F, the absolute value of the computed travel load estimation value FR falls so that it is equal to or less than the absolute value FB of the OD maximum drive torque learning value FB which was stored at the point C. At this point, the vehicle's cruise control unit 1 determines that the target acceleration αr can be maintained even if there were a shift up to OD, and a command is issued to shift up to the OD position.

When acceleration control starts when the vehicle is traveling on a steep slope, it may occur that learning of the OD maximum drive torque learning value FB is never completed. In such a case, the predetermined value Fk which was preset is used instead of the OD maximum drive torque, as in the step S122. This entails a slight loss of control accuracy, however it ensures that a shift to higher or lower gear can be made, that drive torque is available depending on the gradient, and that the target acceleration αr is maintained.

Assuming that acceleration control starts from a point A and is disengaged at a point E midway on a rising slope as shown in FIGS. 13A–13G, as the target acceleration αr is 0 at the point E where acceleration control is released, the travel load estimation value FR=the travel resistance Fr, and the travel load resistance estimation value FR becomes less than the OD maximum drive torque learning value FB stored at the point C. In this case, as in the case of the aforesaid first embodiment, it is determined that the road gradient has returned to a level at which the target vehicle speed Vspr can be maintained, a shift up to OD is made, and cruise control is continued.

Deceleration control during cruise control is shown in FIGS. 14A–14G. Herein, deceleration control starts at a point A, the road slopes steeply downwards from a point B, the road gradient gradually decreases, and at a point C, the difference between the real acceleration α and target acceleration αr becomes equal to the second predetermined value $\alpha_B$ as shown by the solid line in FIG. 14E. As a result, due to increase of the real acceleration $\alpha$, the target acceleration $\alpha r$ can no longer be maintained.

At this point, the cruise control unit 1 determines that the maximum engine braking torque that can be obtained in the OD position has been reached, and the travel load resistance FR including the deceleration is stored as the OD maximum drive torque learning value FB. However if a shift to lower gear were made at this point, the driver would experience an unpleasant sensation as the absolute value of the acceleration difference is still small, so the OD position is maintained at this stage.

At a point D where the absolute value of the difference between the real acceleration $\alpha$ and the target acceleration $\alpha r$ has increased to the first set value $\alpha_A$, a shift from the OD position down to third gear (D3) is made.

At the point D the road gradient becomes constant, and as there is excess engine braking force due to the shift down to third gear, the real acceleration $\alpha$ gradually returns to the target acceleration $\alpha r$.

From a point E, the road gradually becomes a flat track, and at a point F, the absolute value of the travel load resistance FR becomes equal to or less than the OD maximum drive torque learning value FB stored at the point C. As a result, the cruise control unit 1 determines that the target acceleration $\alpha r$ can be maintained even if there were a shift up to OD, so there is a shift up to the OD position and deceleration continues.

Shifts to higher and lower gear are therefore performed smoothly without causing shift hunting even under deceleration control during cruise control.

When deceleration control starts when the vehicle is traveling on a steep descent, it may occur that learning of the OD maximum drive torque learning value FB is never completed. In such a case, the predetermined value Fk which was preset is used instead of the OD maximum drive torque, as in the step S122. This entails a slight loss of control accuracy, however it ensures that a shift to higher or lower gear can be made, that engine braking torque is available depending on the gradient, and that the target acceleration $\alpha r$ is maintained.

In FIGS. 15A–15G, deceleration control starts from a point A as in FIGS. 14A–14G. When deceleration control is disengaged at a point E midway on a descending slope, the target acceleration $\alpha r$ is 0 at the point E where deceleration control is released. As a result, the travel load estimation value FR=the travel resistance Fr, and the absolute value of the travel load resistance estimation value FR becomes less than the OD maximum drive torque learning value FB stored at the point C. In this case, as in the case of the aforesaid first embodiment, the cruise control unit 1 determines that the road gradient has returned to a level at which the target vehicle speed Vspr can be maintained, a shift up to OD is made, and cruise control is continued.

In this way, the maximum drive torque that can be obtained in the OD position during cruise control is learnt as the OD maximum drive torque learning value FB. By comparing the absolute value of this OD maximum drive torque learning value FB with the absolute value of the travel load estimation value FR, shifts from the OD position to lower gear and shifts from lower gear up to the OD position are made smoothly under all travel conditions without causing hunting, and cruise control can be continued while performing acceleration and deceleration control as desired.

The embodiments of this invention in which an exclusive property or privilege is claimed are defined as follows:

1. A vehicle cruise control system comprising:
    means for setting a target vehicle speed,
    means for detecting a vehicle speed,
    means for adjusting an output of an engine,
    means for changing-over a gear shift position,
    means for controlling said adjusting means and changing-over means such that a detected vehicle speed is identical to said target vehicle speed,
    means for computing a difference between said target vehicle speed and detected vehicle speed,
    means for commanding said changing-over means to shift to lower gear position when an absolute value of said difference has reached a first predetermined value $\alpha_1$,
    means for estimating a travel resistance Fr of said vehicle,
    means for learning said estimated travel resistance Fr as a maximum drive torque FB of said engine when said difference has reached a second predetermined value $\alpha_2$ which is less than said first predetermined value $\alpha_1$, and
    means for commanding said changing-over means to shift to higher gear position when an absolute value of said estimated travel resistance Fr has become less than an absolute value of said learned maximum drive torque FB after said shift to lower gear position.

2. A vehicle cruise control system as defined in claim 1, further comprising means for determining whether or not said learning means has completed learning said maximum drive torque FB, and means for commanding said changing-over means to shift to higher gear position when an absolute value of said travel resistance Fr has become less than a predetermined value Fk in case said learning is not complete.

3. A vehicle cruise control system as defined in claim 1, wherein said system further comprises means for detecting a drive torque of said engine, and wherein said estimating means is provided with a vehicle model specifying a relation between the vehicle speed and the drive torque when the vehicle is traveling without the travel resistance, means for computing, from said vehicle model, a drive torque required to generate the detected vehicle speed, and means for deriving said travel resistance Fr from a difference between said computed drive torque and detected drive torque.

4. A vehicle cruise control system comprising:
    means for setting a target vehicle speed,
    means for detecting a vehicle speed,
    means for adjusting an output of an engine,
    means for changing-over a gear shift position,
    means for controlling said adjusting means and changing-over means such that a detected vehicle speed is identical to said target vehicle speed,
    means for detecting a vehicle acceleration,
    means for modifying said target vehicle speed according to a predetermined target acceleration,
    means for estimating a travel resistance Fr of said vehicle,
    means for computing a travel load FR based on the vehicle acceleration and travel resistance Fr,
    means for computing a difference between said target acceleration and said detected acceleration,
    first commanding means for commanding said changing-over means to shift to lower gear position when the absolute value of said difference has reached a first predetermined value $\alpha_A$, means for learning said travel load FR as a maximum drive torque FB of said engine when the absolute value of said difference has reached a second predetermined value $\alpha_B$ which is less than said first predetermined value $\alpha_A$, and second commanding means for commanding said changing-over means to shift to higher gear position when an absolute value of said estimated travel resistance Fr has become less than an absolute value of said learned maximum drive torque FB after said shift to lower gear position.

5. A vehicle cruise control system as defined in claim 4, wherein said system further comprises means for detecting a drive torque of said engine, and wherein said estimating means is provided with a vehicle model specifying a relation between the vehicle speed and the drive torque when the vehicle is traveling without the travel resistance, means for computing, from said vehicle model, a drive torque required to generate the detected vehicle speed, and means for deriving said travel resistance Fr from a difference between said computed drive torque and detected drive torque.

6. A vehicle cruise controller as defined in claim 4, wherein said first commanding means commands a shift to lower gear position based on said difference of acceleration when said modifying means is modifying said target vehicle speed, and commands a shift to lower gear position based on a difference between the target vehicle speed and detected vehicle speed when said modifying means is not modifying said target vehicle speed.

7. A vehicle cruise system as defined in claim 4, further comprising means for determining whether or not said learning means has completed learning said maximum drive torque FB, and means for commanding said changing-over means to shift to higher gear position when an absolute value of said travel resistance Fr has become less than a predetermined value Fk in case said learning is not complete.

* * * * *